(12) United States Patent
Bae et al.

(10) Patent No.: US 8,583,732 B2
(45) Date of Patent: Nov. 12, 2013

(54) METHOD AND APPARATUS FOR PROVIDING MULTIMEDIA MESSAGING SERVICE

(75) Inventors: Young Kyu Bae, Suwon-si (KR); Ho Chul Shin, Suwon-si (KR); Chul Seung Kim, Seoul (KR); Hee Won Jung, Suwon-si (KR); Yun Je Oh, Yongin-si (KR); Joon Oo Kim, Suwon-si (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 1744 days.

(21) Appl. No.: 11/696,205

(22) Filed: Apr. 4, 2007

(65) Prior Publication Data

US 2007/0264975 A1 Nov. 15, 2007

(30) Foreign Application Priority Data

May 9, 2006 (KR) .......................... 10-2006-0041329

(51) Int. Cl.
*H04L 12/58* (2006.01)
(52) U.S. Cl.
USPC ............................ 709/204; 709/205; 709/219
(58) Field of Classification Search
USPC ................. 709/204, 203, 205–207, 217–219; 707/770, 966–974; 715/733–759
See application file for complete search history.

(56) References Cited

U.S. PATENT DOCUMENTS

| 7,302,254 | B2* | 11/2007 | Valloppillil ................ 455/414.1 |
| 7,519,681 | B2* | 4/2009 | Edwards et al. ............. 709/217 |
| 7,865,394 | B1* | 1/2011 | Calloway et al. ........... 705/14.4 |
| 2005/0138123 | A1* | 6/2005 | Yun et al. ...................... 709/206 |
| 2005/0176449 | A1* | 8/2005 | Cui et al. ...................... 455/466 |
| 2006/0195506 | A1* | 8/2006 | Deng ............................ 709/203 |

FOREIGN PATENT DOCUMENTS

| KR | 2005-29988 | 3/2005 |
| KR | 2005-112177 | 11/2005 |
| KR | 10-662509 | 12/2006 |
| KR | 2007-48922 | 5/2007 |

* cited by examiner

*Primary Examiner* — Ruolei Zong
(74) *Attorney, Agent, or Firm* — Cha & Reiter, LLC

(57) ABSTRACT

A method for providing a multimedia messaging service according to the present invention includes the steps of: collecting multimedia contents accessible through a network in response to a request for preparing a multimedia message, generating the multimedia message including multimedia file access information by selecting a multimedia file from the collected multimedia contents, converting the multimedia message to a web page, transmitting the web page as an Internet mail, extracting the multimedia file access information from the web page included in the mail after receiving the mail, accessing a multimedia file by using the multimedia file access information and executing the multimedia file.

24 Claims, 6 Drawing Sheets

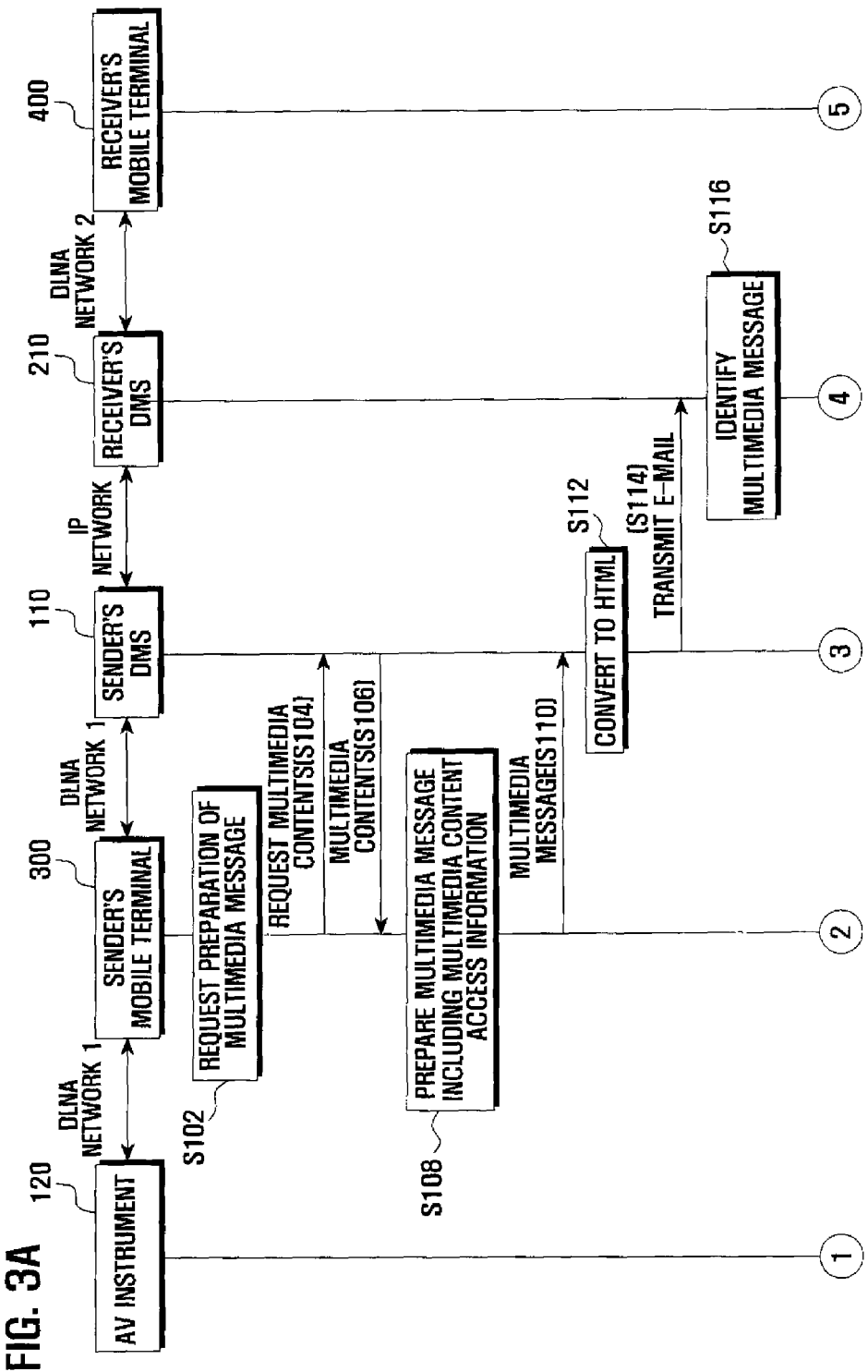

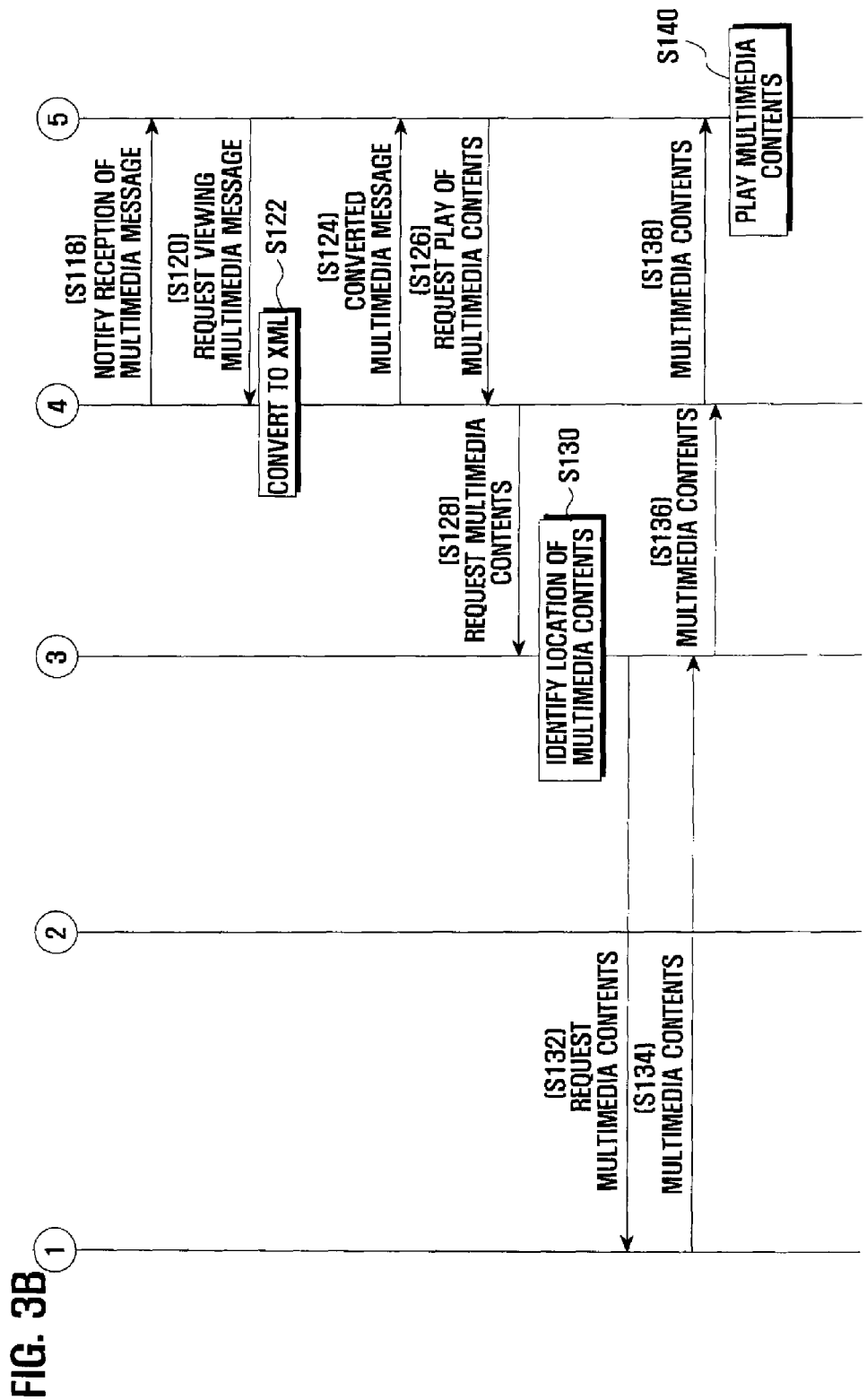

METHOD AND APPARATUS FOR PROVIDING MULTIMEDIA MESSAGING SERVICE

CLAIMS OF PRIORITY

This application claims the benefit of the earlier filing date, pursuant to 35 USC 119, to that patent application entitled "METHOD AND APPARATUS FOR PROVIDING MULTIMEDIA MESSAGING SERVICE" filed in the Korean Intellectual Property Office on May 9, 2006 and assigned Serial No. 2006-0041329, the contents of which are incorporated herein by reference.

BACKGROUND OF THE INVENTION

1. Field of the Invention

The present invention relates to a method and an apparatus for providing a multimedia messaging service, and more particularly, to a method and an apparatus for providing a multimedia messaging service by using a Digital Living Network Alliance (hereinafter, DLNA) network.

2. Description of the Prior Art

Due to development in communication technology and popularization of mobile terminals, mobile terminals have become capable of supporting various functions, such as character transmission and image transmission, in addition to voice communication. In particular, with increasing serviceable area of a mobile communication network, transmission and reception of a multimedia message have been enabled utilizing the mobile terminals.

The multimedia message includes multimedia files such as a photo, moving picture, and music files. However, in the prior art, the multimedia files must be stored in a multimedia message preparation apparatus in advance. That is, only the multimedia files stored in the multimedia message preparation device may be added to the multimedia message.

For example, in the case of preparing a multimedia message by using a mobile terminal, only the multimedia files pre-stored in the mobile terminal may be added to the multimedia message. In the case of preparing a multimedia message by using a personal computer, only the multimedia files pre-stored in the personal computer may be added to the multimedia message.

Therefore, the multimedia message preparation apparatus must secure multimedia files in order to add to a multimedia message. In the case of adding a certain image to a multimedia message, a user must store an image file in the multimedia message preparation apparatus in advance, and prepare the multimedia message by using the image file.

Accordingly, selection of multimedia files to be added to a multimedia message is limited. In the case of a mobile terminal, the number of multimedia files to be stored in the memory is limited and selection of the multimedia files to be added to a multimedia message is further limited, as storage capacity is limited due to operational characteristics in supporting mobility and portability.

SUMMARY OF THE INVENTION

The present invention has been made in view of the above problems, and an object of the present invention is to provide a method and an apparatus for a multimedia messaging service enabling free addition of multimedia files to a multimedia message.

Another object of the present invention is to provide a method and an apparatus for a multimedia messaging service by using a DLNA network.

In order to achieve the above objects, a method for providing a multimedia messaging service according to an exemplary embodiment of the present invention includes the steps of collecting multimedia contents accessible through a network in response to a request for preparing a multimedia message, generating the multimedia message including multimedia file access information by selecting a multimedia file from the collected multimedia contents, converting the multimedia message to a web page, transmitting the web page as an Internet mail, extracting the multimedia file access information from the web page included in the mail after receiving the mail, accessing a multimedia file by using the multimedia file access information, and executing the multimedia file. Accordingly, the present invention provides free selection of multimedia files to be added to a multimedia message, and easier preparation of a multimedia message.

The step of collecting multimedia contents preferably includes the steps of requesting the multimedia contents accessible through a first DLNA (Digital Living Network Alliance) network to which a mobile terminal of a sender of the multimedia message is connected; and receiving the multimedia contents including the multimedia file access information through the first DLNA network.

The step of generating the multimedia message preferably includes the steps of selecting at least one multimedia file to be added to the multimedia message from multimedia files included in the received multimedia contents, extracting the address of the first DLNA network in which the selected multimedia file is stored and generating the multimedia message including the extracted address of the first DLNA network.

In the step of converting the multimedia message, the multimedia message is preferably converted to the web page by using Hyper Text Markup Language (hereinafter, HTML).

The step of extracting the multimedia file access information preferably includes the steps of identifying whether the web page included in the received mail is a multimedia message, transmitting, if the web page is a multimedia message, a notifying signal of reception of a multimedia message to a mobile terminal of a receiver by detecting the telephone number of the mobile terminal of the receiver, transmitting the web page to the mobile terminal of the receiver by converting the web page to a mobile terminal display format according to a request signal for viewing the multimedia message and extracting multimedia file access information included in the multimedia message according to a request signal for executing the multimedia file.

The step of accessing the multimedia file preferably includes the steps of transmitting, through Internet, the request signal for executing the multimedia file including the multimedia file access information to the first DLNA network to which the sender's mobile terminal is connected and requesting the multimedia file to an instrument storing multimedia files in the first DLNA network by using the multimedia file access information.

The step of executing the multimedia file preferably includes the steps of receiving the multimedia file from a multimedia file storage unit connected to the first DLNA network, transmitting, through Internet, the multimedia file to a second DLNA network to which the receiver's mobile terminal is connected, transmitting the multimedia file to the receiver's mobile terminal through the second DLNA network and executing the multimedia file with the receiver's mobile terminal.

In order to achieve the above objects, an apparatus according to another exemplary embodiment of the present invention includes a mobile terminal connected to a DLNA network for preparing a multimedia message and a content management apparatus for integrally controlling contents of instruments connected to the DLNA network.

The mobile terminal includes a DLNA interface unit for requesting multimedia contents accessible through a DLNA network according to a request for preparing a multimedia message and for receiving a corresponding response and a control unit for selecting, from the received multimedia contents, at least one multimedia file to be added to the multimedia message according to input selection information and for generating a multimedia message including the multimedia file access information.

The control unit preferably extracts the address of the DLNA network in which the selected multimedia file is stored and generates a multimedia message including the address of the DLNA network.

The DLNA interface unit preferably receives a notifying signal of reception of a multimedia message through the DLNA network and transmits a request signal for viewing the multimedia message to the DLNA network.

The DLNA interface unit preferably receives a multimedia message provided with a web page in Extension Markup Language (hereinafter, XML) format through the DLNA network and transmits a request signal for executing the multimedia file included in the multimedia message to the DLNA network.

The content management apparatus includes a DLNA interface unit for controlling the communication of the DLNA network, a multimedia content storage unit for storing multimedia contents accessible through the DLNA network, a control unit for controlling, if a request signal for multimedia contents is received through the DLNA interface unit, the DLNA interface unit such that the multimedia contents stored in the multimedia content storage unit is transmitted according to the request signal, a document conversion unit for converting, if a multimedia message is received through the DLNA interface unit, the multimedia message to a web page and a web communication interface unit for controlling web communication and transmitting the web page converted by the document conversion unit as an Internet mail.

The multimedia content storage unit preferably stores multimedia contents including multimedia files accessible through the DLNA network and a DLNA network address of an instrument in which the multimedia files are stored.

If an e-mail including a multimedia message in a web page format is received through the web communication interface unit, the DLNA interface unit preferably transmits a notifying signal of reception of a multimedia message to a mobile terminal of a receiver of the multimedia message.

The document conversion unit preferably converts the multimedia message in a web page format to an XML format in response to a request signal for viewing a message from the receiver's mobile terminal.

The DLNA interface unit preferably transmits the multimedia message provided with a web page in an XML format to the receiver's mobile terminal and receives a request signal for executing the multimedia file included in the multimedia message from the receiver's mobile terminal.

The control unit preferably controls extraction of the multimedia file access information in response to the request signal for executing the multimedia file, and controls execution of the multimedia file by using the multimedia file access information.

The multimedia file access information is preferably a DLNA network address of an instrument storing the multimedia files in the DLNA network to which a mobile terminal of a sender of the multimedia message is connected.

BRIEF DESCRIPTION OF THE DRAWINGS

The above and other objects, features and advantages of the present invention will become more apparent from the following detailed description in conjunction with the accompanying drawings, in which:

FIG. 3A to 3B are flow charts showing a method for providing a multimedia messaging service by using a DLNA networked system according to an exemplary embodiment of the present invention;

DETAILED DESCRIPTION OF EXEMPLARY EMBODIMENTS

Figure 1:
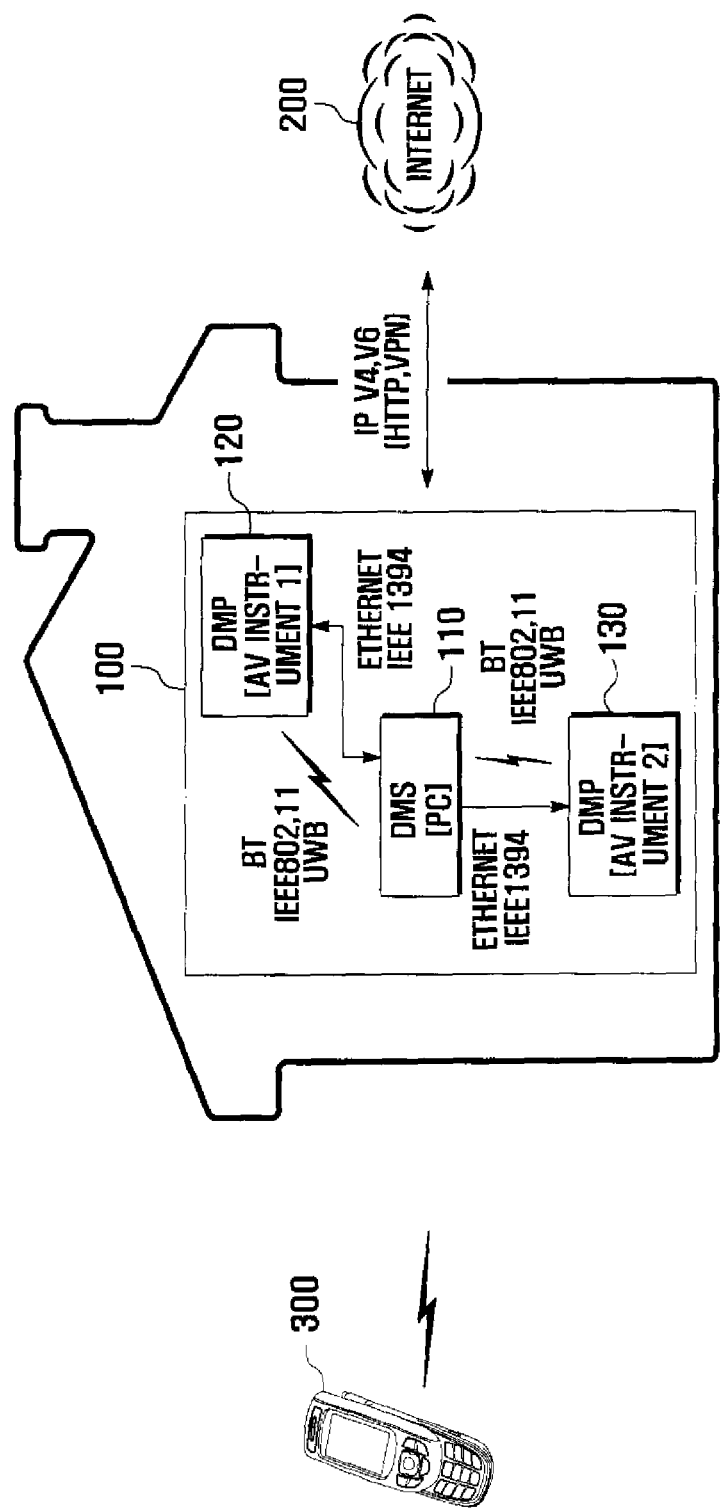
FIG. 1 is a view showing a configuration of a DLNA networked system according to the present invention.

Hereinafter, exemplary embodiments of the present invention are described in detail with reference to the accompanying drawings. The same reference numbers are used for the same or like components in the drawings. Additionally, detailed explanations for well-known functions and compositions may be omitted to avoid obscuring the subject matter of the present invention.

FIG. 1 is a view showing a configuration of a DLNA networked system according to the present invention.

Digital Living Network Alliance (DLNA) established a standard for controlling information-related home electronic instruments, such as personal computers, televisions, VTRs, digital cameras, and audio systems, for the standardization of home-network systems. DLNA is a standardization organization established in June 2003 for sharing all contents (for example, multimedia files) provided by information-related home electronic instruments, and has been joined by Microsoft, IBM, HP, Intel, Sony, Matsushita, Samsung Electronics, and other companies.

A major function of DLNA is to improve compatibility between various home electronic instruments. For this, DLNA performs standardization of physical media, network transmission, media format, streaming protocol, and DRM (Digital Rights Management) based on UPnP (Universal Plug and Play) technology, and supports a network system between home electronic instruments based on IP (Internet Protocol).

Home electronic instruments connected to a DLNA networked system share various contents (for example, multimedia files) stored in the instruments by using IP addresses allocated by the DLNA networked system.

Referring to FIG. 1, the DLNA networked system includes a DLNA home networked system 100 and a mobile terminal 300 connected to the DLNA home networked system 100.

The DLNA home networked system 100 includes a digital media server (hereinafter, DMS) 110, such as a personal computer, for providing multimedia contents, and a plurality of digital media players (hereinafter, DMP) 120 and 130, such as AV (audio and video) instruments, for executing the multimedia contents provided by the DMS 110. The DMS 110 and DMPs 120 and 130 perform wired or wireless communication. In the case of wired communication, the DMS 110 and DMPs 120 and 130 perform communication through IEEE 1394 or Ethernet. In the case of wireless communication, the DMS 110 and DMPs 120 and 130 preferably perform communication through Bluetooth, IEEE 802.11, or Ultra Wide Band. The DMS 110 may include a function of a home gateway in the home networked system, and the DMPs 120 and 130 may include a function of a control point.

Communication between the DLNA home networked system 100 and the Internet 200 is performed by using IPv4 and IPv6 protocols, HTTP, and VPN, and the mobile terminal 300 is connected to the DLNA home networked system 100.

Information including digital contents may be shared between various instruments connected to the DLNA home networked system 100. For example, an AV content stored in the DMS 110 may freely be played by the DMP 120 or DMP 130, and information obtained by the DMS 110 through the Internet may be shared by various instruments connected to the DLNA home networked system 100. For this, the DLNA home networked system 100 requires a content management apparatus for managing content stored in various instruments, and the DMS 110 generally performs the function of the content management apparatus.

Accordingly, the mobile terminal 300 may access the information stored in the DLNA home networked system through the DMS 110, and may generate a multimedia message by using the accessed information.

As described above, the present invention provides an apparatus and a method for generating and transmitting a multimedia message by using access information (for example, DLNA network address) through a DLNA networked system, and for executing a multimedia file included in the multimedia message.

Figure 2:
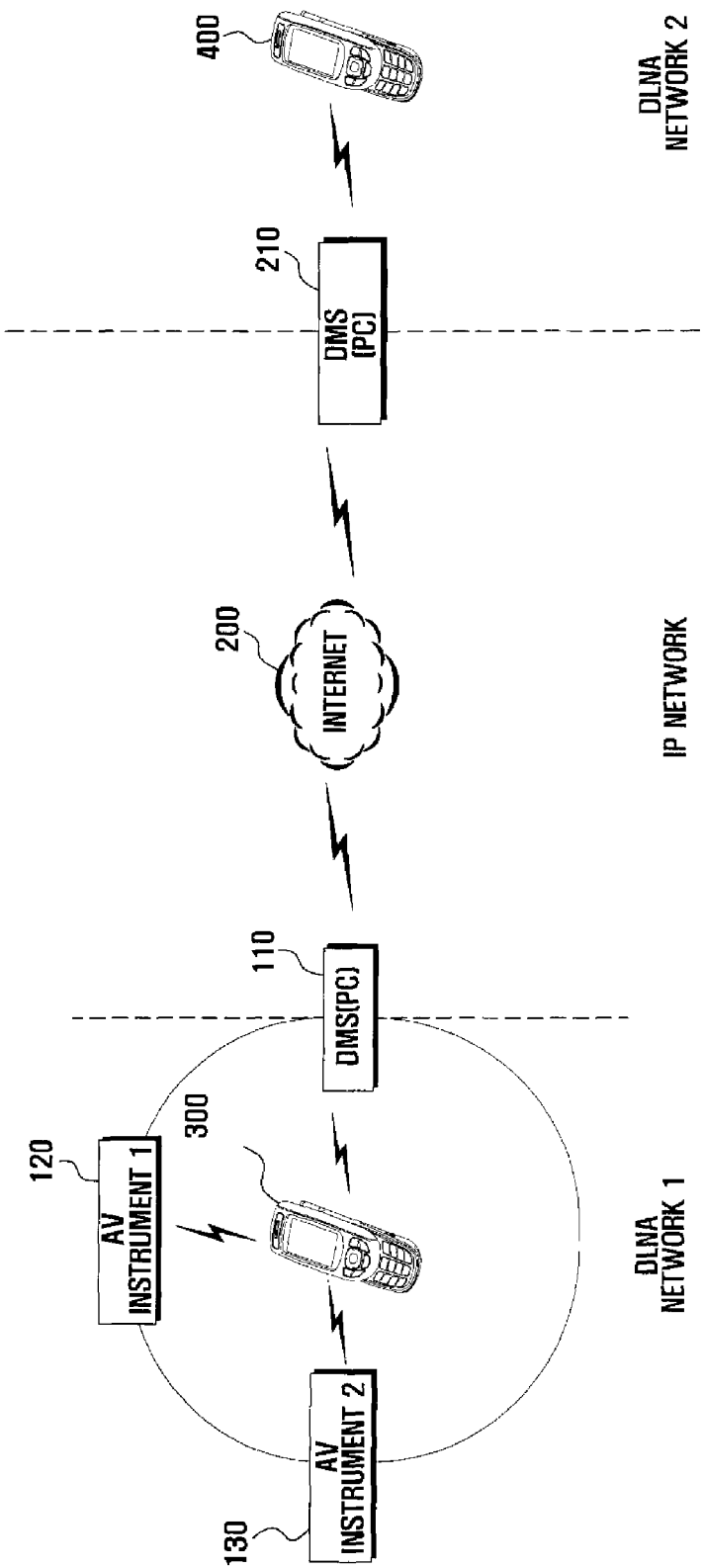
FIG. 2 is a view showing a system configuration for providing a multimedia messaging service according to an exemplary embodiment of the present invention.

FIG. 2 is a view showing a system configuration for providing a multimedia messaging service according to an exemplary embodiment of the present invention. FIG. 2 illustrates a system configuration for transmitting a multimedia message between different DLNA networks (i.e. between a first DLNA network and a second DLNA network) connected through an IP network.

Referring to FIG. 2, a mobile terminal 300 connected to the first DLNA network receives information on multimedia contents from a DMS 110 (i.e. personal computer) accessible through the first DLNA network. For example, the mobile terminal 300 receives multimedia files stored in a first AV instrument 120 and a second AV instrument 130 from the DMS 110, and DLNA network addresses of the AV instruments 120 and 130. The mobile terminal 300 then generates a multimedia message by using the DLNA network addresses and multimedia files, and transmits the multimedia message to the DMS 110.

The DMS 110 transmits the multimedia message to a DMS 210 of the second DLNA network through the Internet 200. That is, the DMS 110 converts the multimedia message to a web page, and transmits the web page to the DMS 210 as an e-mail.

The DMS 210, having received the e-mail, transmits the web page to a mobile terminal 400 (i.e. receiver's mobile terminal), and, in response to a request for execution of a multimedia file from the mobile terminal 400, requests execution of the multimedia file to the corresponding instrument (i.e. first AV instrument 120 or second AV instrument 130) through the Internet 200 and DMS 110.

As described above, the present invention enables free selection of a multimedia file to be included in a multimedia message while preparing the multimedia message.

FIG. 3A to 3B are flow charts showing a method for providing a multimedia messaging service by using a DLNA networked system according to an exemplary embodiment of the present invention. FIG. 3A to 3B illustrate a process of transmitting a multimedia message in a synchronizing system between the DLNA network and IP network having the configuration shown in FIG. 2. A mobile terminal 300 connected to a first DLNA network generates a multimedia message including a multimedia file stored in a first AV instrument 120, and transmits the multimedia message to a mobile terminal 400 connected to a second DLNA network.

Referring to FIG. 3A to 3B, a method of transmitting and receiving a multimedia message according to an exemplary embodiment of the present invention is described as follows.

Firstly, when preparation of a multimedia message is requested (S102), the mobile terminal 300 collects multimedia contents accessible through a network in response to the request. For this, the mobile terminal 300 requests multimedia contents to a DMS 110 to which the mobile terminal 300 and a first DLNA network are connected (S104), and receives the multimedia contents from the DMS 110 (S106). The mobile terminal 300 receives multimedia contents including access information (for example, DLNA network address) through the first DLNA network.

The mobile terminal 300, having received the multimedia contents, selects a multimedia file to be added to a multimedia message from the multimedia contents, and generates a multimedia message including access information on the multimedia file (S808). For this, the mobile terminal 300 selects at least one multimedia file to be added to the multimedia message from the multimedia files included in the received multimedia contents according to external selection information (for example, user's selection information), and extracts the address of the first DLNA network, in which an instrument storing the selected multimedia file is installed. The mobile terminal 300 preferably generates a multimedia message including the address extracted from the first DLNA network. The following is an example of the generated multimedia message.

```
<MMS>
    <from></from>
    <to></to>
    <msg> Tommy, watch this moving picture! </msg>
    <contents>
        <contents_title> Moving picture of my nephew's first
        birthday </contents_title>
        <video> http://IP of DLNA DMS LAN/dol.avi </video>
    </contents>
</MMS>
```

The mobile terminal 300, having generated a multimedia message in the step S108, transmits the multimedia message to the DMS 110 through the first DLNA network (S110).

The DMS 110, having received the multimedia message, converts the multimedia message to a web page expressed by Hyper Text Markup Language (hereinafter, HTML) (S112). The following is an example of the multimedia message converted to an HTML format.

```html
<html>
  <header>
  <title>MMS</title>
  </header>
  <body>
     <p> Tommy, watch this moving picture! </p>
     <a> href="http://public IP of PC/http://IP of DLNA DMS LAN IP/dol.avi" Moving picture of my nephew's first birthday </a>
  </body>
</html>
```

The DMS 110, having converted the multimedia message to a web page in an HTML format, transmits the web page as an Internet mail to a DMS 210, to which a receiver's mobile terminal 400 is connected via a DLNA network (for example, second DLNA network) (S114).

After receiving the mail, the receiver's DMS 210 extracts multimedia file access information included in the multimedia message from the web page included in the mail. For this, the receiver's DMS 210 identifies whether the web page included in the received mail is a multimedia message (S116). If the web page is a multimedia message, a notifying signal of reception of the multimedia message is transmitted to the receiver's mobile terminal 400. Preferably, the DMS 210 detects the telephone number of the receiver's mobile terminal 400 from the web page, and transmits the notifying signal of reception of the multimedia message through the second DLNA network.

If the receiver's mobile terminal 400 transmits a signal for viewing the multimedia message in response to the signal for notifying the multimedia message (S120), the DMS 210 converts the web page to the multimedia message in a mobile terminal display format, namely, an XML format, in response to the request for viewing the multimedia message (S122). The converted multimedia message is then transmitted to the receiver's mobile terminal 400 (S124).

If the receiver's mobile terminal 400, after receiving the converted multimedia message, requests execution of multimedia contents included in the multimedia message (S126), the receiver's DMS 210 transmits a request for execution of the multimedia contents to the sender's DMS 110 (S128). The sender's DMS 110 identifies the location of the requested multimedia contents (i.e. through access information on the multimedia contents) (S130), and transmits the request for execution of the multimedia contents to an instrument (for example, the first AV instrument 120) storing multimedia contents (S132). The access information on the multimedia contents is preferably the address of the first DINA network in which an instrument (for example, the first AV instrument 120) storing multimedia contents is installed.

The corresponding instrument (for example, the first AV instrument 120) detects the corresponding multimedia contents from multimedia contents stored therein, and transmits the multimedia contents to the receiver's mobile terminal 400 through the first DLNA network (S134), IP network (S136), and second DLNA network (S138). The receiver's mobile terminal 400 then plays the multimedia contents (S140).

Preferably, the first AV instrument 120, sender's mobile terminal 300, and sender's DMS 110 are connected through the first DLNA network; the sender's DMS 110 and receiver's DMS 210 are connected through the IP network; and the receiver's DMS 210 and receiver's mobile terminal 400 are connected through the second DLNA network.

Figure 4:
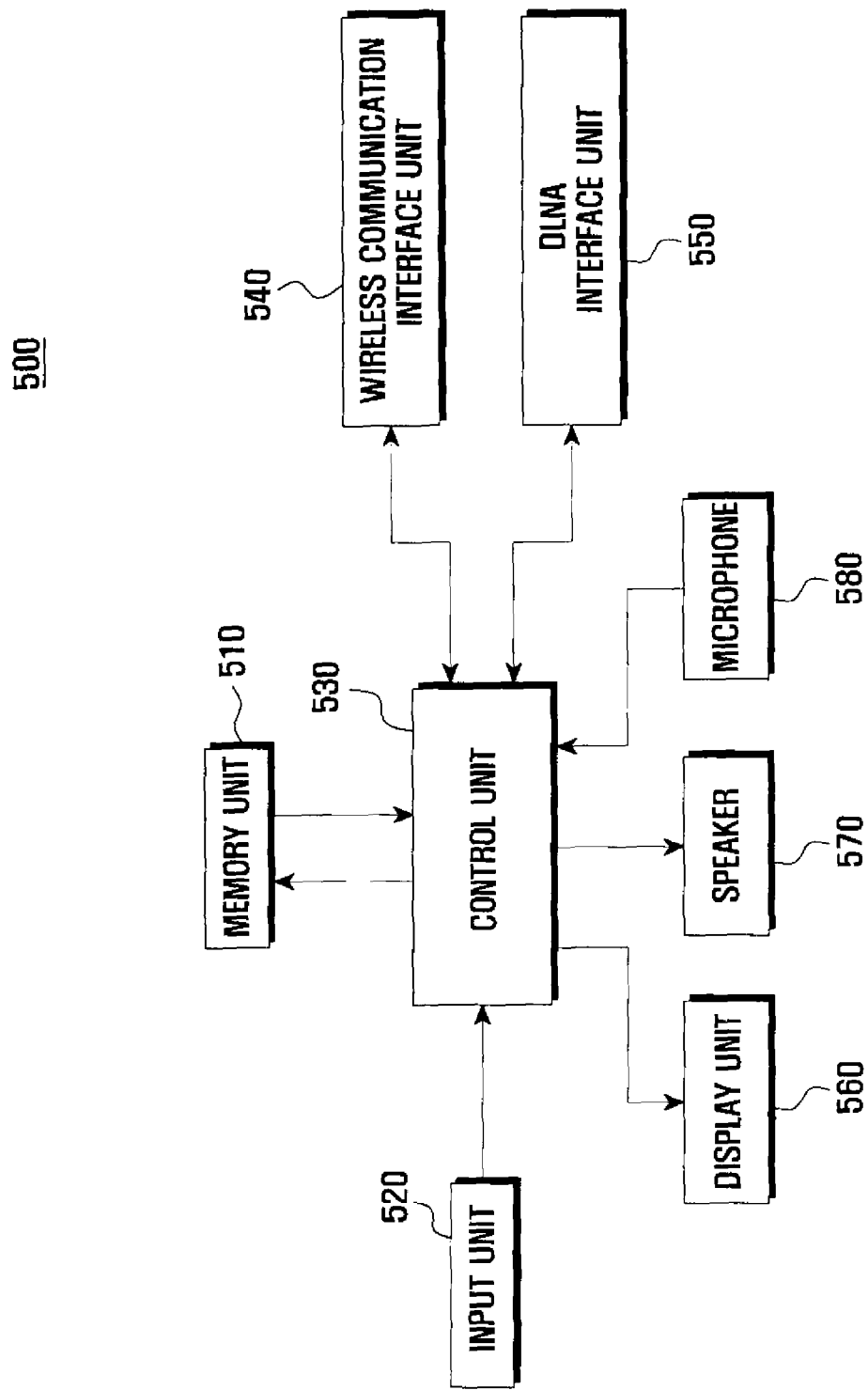
FIG. 4 is a schematic block diagram of a mobile terminal for providing a multimedia messaging service according to an exemplary embodiment of the present invention.

FIG. 4 is a schematic block diagram of a mobile terminal 500 for providing a multimedia messaging service according to an exemplary embodiment of the present invention. Referring to FIG. 4, the mobile terminal 500 includes a memory unit 510, input unit 520, control unit 530, wireless communication interface unit 540, DLNA interface unit 550, display unit 560, speaker 570, and microphone 580.

The memory unit 510 stores information related to the operation of the mobile terminal 500 such as a program for a system drive control, data related to the program, telephone book, address book, and short message.

The input unit 520 inputs a user's signal for the operation of the mobile terminal 500' and transmits the signal to the control unit 530.

The control unit 530 controls the operation of the mobile terminal 500 according to the signal input by the input unit 520 and operating programs pre-stored in the memory unit 510. Control unit 530 may be a processor suitable for executing computer instructions to perform the exemplary processing described herein. The computer instructions may be stored in the memory 510. Alternatively, control unit 530 may comprise hardware and/or software elements that are programmed to execute the processing described herein.

When the mobile terminal 500 generates a multimedia message, the control unit 530 selects, from multimedia contents received through the DLNA interface unit 550, at least one multimedia file to be added to the multimedia message, and generates the multimedia message including access information on the multimedia files. Preferably, the control unit 530 selects multimedia files according to selection information input by the input unit 520, and generates the multimedia message including an address of a DLNA network after extracting the address of the DLNA network in which an instrument storing the selected multimedia file is installed.

When the mobile terminal 500 receives a multimedia message generated by the above method through a DLNA network, the control unit 530 preferably requests execution of multimedia contents included in the multimedia message to the DLNA network in response to the user's request, and controls execution of received multimedia contents.

The wireless communication interface unit 540 performs the wireless communication by transmitting and receiving data through a mobile communication network, which is an essential function of the mobile terminal 500.

The DLNA interface unit 550 stores a DLNA protocol, and performs data communication through a DLNA network. When the mobile terminal 500 prepares a multimedia message for transmission, the DLNA interface unit 550 requests multimedia contents accessible through the DLNA network corresponding to a user command for preparing the multimedia message, and receives a response through the DLNA network.

When the mobile terminal 500 receives a multimedia message generated by the above method through a DLNA network, the DLNA interface unit 550 receives a notifying signal of reception of the multimedia message through the DLNA network, and transmits a signal for viewing the multimedia message to the DLNA network. The DLNA interface unit 550 receives a multimedia message in an XML format in response to the request for viewing the multimedia message, and transmits a signal for execution of a multimedia file included in the multimedia message to the DLNA network.

The display unit 560 is controlled by the control unit 530, and displays various kinds of information related to the operation status of the mobile terminal 500 and time information. Preferably, the display unit 560 displays a message of notifying reception of a multimedia message and the result of execution of multimedia contents included in the received multimedia message.

The speaker 570 is controlled by the control unit 530, and outputs sounds (for example, a dial tone) related to the operation of the mobile terminal 500. The speaker 570 preferably outputs a sound of notifying reception of a multimedia message during the reception of the multimedia message.

The microphone 580 collects sound signals from the surroundings, and transmits the signals to the control unit 530.

The mobile terminal 500 transmits only access information on multimedia files to be added to a multimedia message during the preparation of the multimedia message. If a multimedia message is received, the mobile terminal 500 accesses the corresponding multimedia file and executes the multimedia file in response to a request for execution of the multimedia file.

Therefore, multimedia files to be added to a multimedia message may more freely be selected while preparing the multimedia message.

Figure 5:
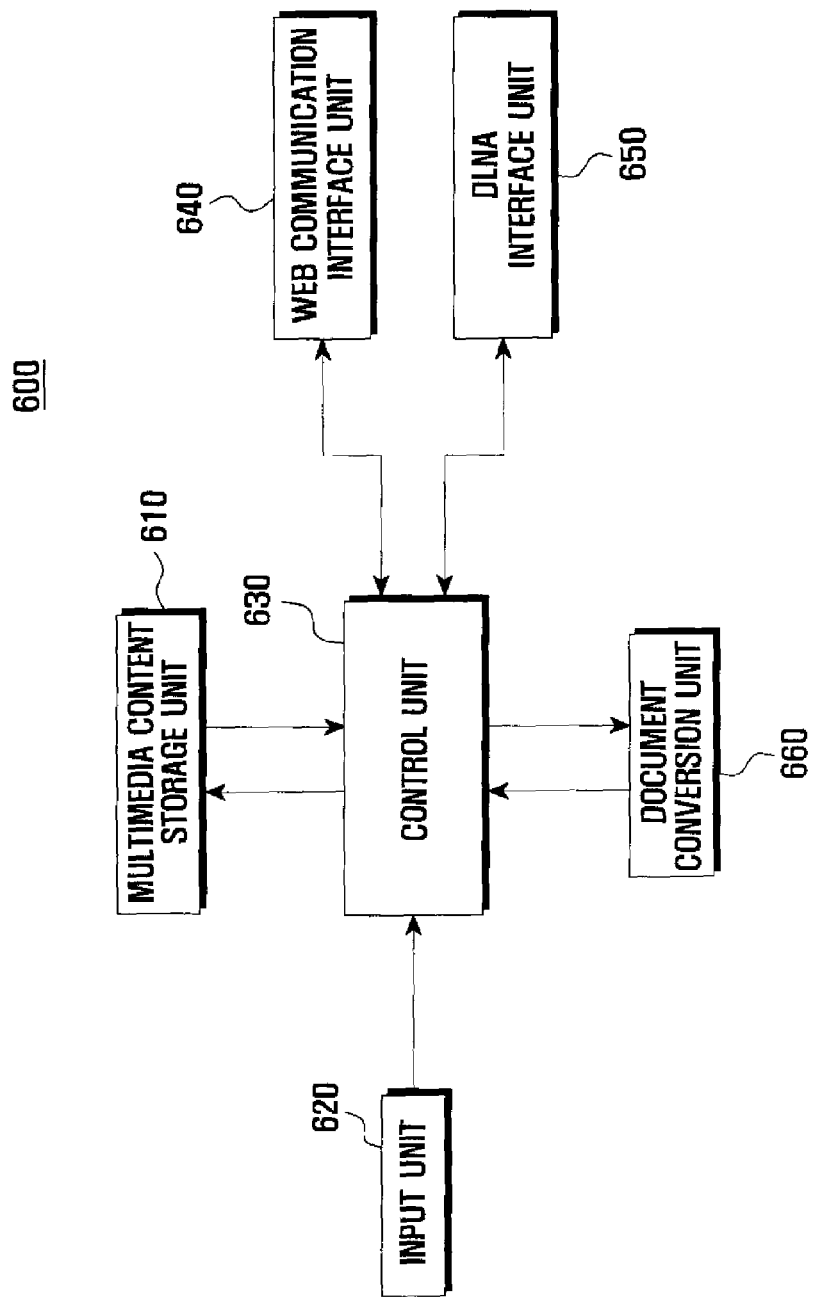
FIG. 5 is a schematic block diagram of a content management apparatus for providing a multimedia messaging service according to an exemplary embodiment of the present invention.

FIG. 5 is a schematic block diagram of a content management apparatus 600 for providing a multimedia messaging service and integrally managing content(s) of instruments connected to a DLNA network, according to an exemplary embodiment of the present invention.

Referring to FIG. 5, the content management apparatus 600 includes a multimedia content storage unit 610, input unit 620, control unit 630, web communication interface unit 640, DLNA interface unit 650, and document conversion unit 660.

The multimedia content storage unit 610 preferably stores multimedia content(s), which includes multimedia files accessible through the DLNA network and a DLNA network address of an instrument storing the multimedia files.

The input unit 620 inputs a user's signal for operation control of the content management apparatus 600, and transmits the signal to the control unit 630.

The control unit 630 controls the operation of the content management apparatus 600 according to a signal input through the input unit 620 or pre-stored operating programs. If a signal of requesting multimedia contents is received through the DLNA interface unit 650, the control unit 630 controls the DLNA interface unit 640 to transmit the multimedia contents stored in the multimedia content storage unit 610 in response to the signal. Control unit 630 may be a processor suitable for executing computer instructions to perform the exemplary processing described herein. The computer instructions may be stored in a memory (not shown) in communication with the processor. Alternatively, control unit 630 may comprise hardware and/or software elements that are programmed to execute the processing described herein.

Preferably, the control unit 630 extracts corresponding access information (for example, location information) on a multimedia file in response to a signal for requesting execution of a multimedia file input by the mobile terminal that received a multimedia message, and controls the execution of the multimedia file by using the access information. The access information on the multimedia file is preferably a DANA network address of an instrument storing the multimedia file in a DLNA network to which the sender's mobile terminal of the multimedia message is connected.

The web communication interface unit 640 controls web communication, and transmits a web page generated by the document conversion unit 660 as an Internet mail. If the content management apparatus 600 receives a multimedia message for transmission from the sender's mobile terminal, the web communication interface unit 640 receives, from the document conversion unit 660, a web page converted in an HTML format from the multimedia message, and transmits the web page through the Internet.

The DLNA interface unit 650 loads a DLNA protocol, and controls communication through the DLNA network. In the case that the content management apparatus 600 performs communication with the sender's mobile terminal, the DLNA interface unit 650 transmits a notifying signal of reception of a multimedia message to the receiver's mobile terminal in response to reception of an c-mail including the multimedia message in a web page format. In the case that the content management apparatus 600 performs communication with the receiver's mobile terminal, the DLNA interface unit 650 transmits a multimedia message converted to a web page in an XML format to the receiver's mobile terminal in response to a request for viewing the multimedia message sent by the receiver's mobile terminal, receives a signal for requesting execution of a multimedia file included in the multimedia message from the receiver's mobile terminal, and transmits the signal to the control unit 630.

The document conversion unit 660 converts a multimedia message into a format executable in a mobile terminal or into a format transmittable through the Internet. That is, the document conversion unit 660 converts a multimedia message generated by the mobile terminal into an HTML format transmittable through the Internet or converts a multimedia message received in an HTML format through the Internet to a multimedia message in an XML format expressible in a mobile terminal. The document conversion unit 660 preferably converts a multimedia message in an HTML format to a multimedia message in an XML format in response to a request signal for viewing the message sent by the receiver's mobile terminal.

As described above, a method and an apparatus for providing a multimedia messaging service according to the present invention enables multimedia files, which are to be added to a multimedia message during preparation of the multimedia message may be received from other instruments connected to a network. Accordingly, the present invention provides free selection of multimedia files to be added to a multimedia message, and easier preparation of a multimedia message.

Although exemplary embodiments of the present invention have been described in detail hereinabove, it should be understood that many variations and/or modifications of the basic inventive concept herein described, which may appear to those skilled in the art, will still fall within the spirit and scope of the exemplary embodiments of the present invention as defined in the appended claims.

What is claimed is:

1. A method for providing a multimedia messaging service, comprising:

at a sender's mobile terminal:

receiving multimedia contents information from a server in a first DLNA (Digital Living Network Alliance) network to which the sender's mobile terminal is connected;

selecting a multimedia file from the received multimedia contents information;

generating a multimedia message including multimedia file access information corresponding to the selected multimedia file, the access information including a DLNA network address of an instrument in the first DLNA network at which the selected multimedia file is stored;

transmitting the multimedia message to a receiver's mobile terminal connected in a second network, to enable subsequent access by the receiver's mobile terminal to the selected multimedia file stored at the instrument via the access information and the server.

2. The method of claim 1, further comprising:
converting the multimedia message to a web page; and
transmitting the web page as an Internet mail.

3. The method of claim 2, wherein, in the step of converting the multimedia message, the multimedia message is converted to the web page by using Hyper Text Markup Language (HTML).

4. The method of claim 2, further comprising:
extracting the multimedia file access information from the web page included in the mail after receiving the mail;
accessing a multimedia file by using the multimedia file access information; and
executing the multimedia file.

5. The method of claim 4, wherein extracting the multimedia file access information comprises:
identifying whether the web page included in the received mail is a multimedia message;
transmitting, if the web page is a multimedia message, a notifying signal of reception of a multimedia message to the receiver's mobile terminal by detecting the telephone number of the receiver's mobile terminal;
transmitting the web page to the receiver's mobile terminal by converting the web page to a mobile terminal display format according to a request signal for viewing the multimedia message; and
extracting multimedia file access information included in the multimedia message according to a request signal for executing the multimedia file.

6. The method of claim 5, wherein, in the step of transmitting the notifying signal of reception of the multimedia message, the notifying signal is transmitted through a second DLNA network to which the receiver's mobile terminal is connected.

7. The method of claim 5, wherein, in the step of transmitting the converted web page, the converted web page is transmitted through a second DLNA network to which the receiver's mobile terminal is connected.

8. The method of claim 7, wherein, in the step of transmitting the converted web page, the web page is converted to an Extensible Markup Language (XML) format.

9. The method of claim 5, wherein, in the step of extracting the multimedia file access information, the multimedia file access information is extracted from the first DLNA network to which the sender's mobile terminal is connected.

10. The method of claim 9, wherein accessing the multimedia file comprises:
transmitting, through the Internet, the request signal for executing the multimedia file including the multimedia file access information to the first DLNA network to which the sender's mobile terminal is connected; and
requesting the multimedia file to an instrument storing multimedia files in the first DLNA network by using the multimedia file access information.

11. The method of claim 10, wherein executing the multimedia file comprises:
receiving the multimedia file from a multimedia file storage unit connected to the first DLNA network;
transmitting, through Internet, the multimedia file to a second DLNA network to which the receiver's mobile terminal is connected;
transmitting the multimedia file to the receiver's mobile terminal through the second DLNA network; and
executing the multimedia file with the receiver's mobile terminal.

12. A first mobile terminal operative to transmit a multimedia message to a second mobile terminal, the first mobile terminal comprising:

a DLNA interface unit that receives multimedia contents information from a server in a DLNA network; and
a control unit for selecting, from the received multimedia contents information, at least one multimedia file to be accessed by the second mobile terminal, according to an input selection, and for generating the multimedia message including multimedia file access information corresponding to the at least one selected multimedia file, the multimedia file access information including a DLNA network address of an instrument within the DLNA network in which the selected multimedia file is stored, to enable subsequent access by the second mobile terminal to the selected multimedia file stored at the instrument via the server.

13. The mobile terminal of claim 12, wherein the DLNA interface unit receives a notifying signal of reception of a multimedia message through the DLNA network and transmits a request signal for viewing the multimedia message to the DLNA network.

14. The mobile terminal of claim 12, wherein the DLNA interface unit receives a multimedia message provided with a web page in an XML format through the DLNA network and transmits a request signal for executing the multimedia file included in the multimedia message to the DLNA network.

15. The mobile terminal of claim 14, wherein the control unit executes the multimedia file requested for execution by receiving the multimedia file through the DLNA network.

16. A content management apparatus for integrally managing contents of instruments connected to a DLNA network, comprising:
a DLNA interface unit for controlling the communication of the DLNA network;
a multimedia content storage unit for storing multimedia contents information accessible through the DLNA network, the contents information including information on multimedia files accessible through the DLNA network and multimedia access information including a DLNA network address of an instrument in which multimedia files are stored;
a control unit for controlling, if a request signal for multimedia contents information is received from a sender's mobile terminal through the DLNA interface unit, the DLNA interface unit such that multimedia contents information stored in the multimedia content storage unit is transmitted to the sender's mobile terminal according to the request signal;
a document conversion unit for converting, if a multimedia message is received through the DLNA interface unit, the multimedia message to a web page, the multimedia message being transmitted by the sender's mobile terminal and intended for a receiver's mobile terminal connected in another network; and
a web communication interface unit for controlling web communication and transmitting the web page converted by the document conversion unit as an Internet mail;
wherein the control unit is further operative to control access by the receiver's mobile terminal to a multimedia file referenced in the multimedia message and stored in the instrument, upon receiving a request for execution of the multimedia file originating from the receiver's mobile terminal.

17. The content management apparatus of claim 16, wherein, if an e-mail including a multimedia message in a web page format is received through the web communication interface unit, the DLNA interface unit transmits a notifying signal of reception of a multimedia message to a mobile terminal of a receiver of the multimedia message.

18. The content management apparatus of claim 17, wherein the document conversion unit converts the multimedia message in a web page format to an XML format in response to a request signal for viewing a message from the receiver's mobile terminal.

19. The content management apparatus of claim 18, wherein the DLNA interface unit transmits the multimedia message provided with a web page in an XML format to the receiver's mobile terminal and receives a request signal for executing the multimedia file included in the multimedia message from the receiver's mobile terminal.

20. The content management apparatus of claim 19, wherein the control unit controls extracting the multimedia file access information in response to the request signal for executing the multimedia file, and controls execution of the multimedia file by using the multimedia file access information.

21. The content management apparatus of claim 20, wherein the multimedia file access information is the DLNA network address of the instrument storing the multimedia files in the DLNA network to which a mobile terminal of a sender of the multimedia message is connected.

22. A method for providing a multimedia messaging service, comprising:
at a sender's mobile terminal:
receiving multimedia contents information from a server in a first DLNA (Digital Living Network Alliance) network to which the sender's mobile terminal is connected;
selecting a multimedia file from the received multimedia contents information;
generating a multimedia message in multimedia message (MMS) data format including multimedia file access information corresponding to the selected multimedia file, the access information including a DLNA network address of an instrument in the first DLNA network at which the selected multimedia file is stored; and
transmitting the multimedia message to the server in the first DLNA; and
at the server in the first DLNA:
converting the multimedia message to a web page; and
transmitting, via the Internet, the multimedia message to a receiver's mobile terminal connected in a second DLNA network, to enable a subsequent access by the receiver's mobile terminal to the selected multimedia file stored at the instrument via the access information and the server.

23. A first mobile terminal operative to transmit a multimedia message to a second mobile terminal, the first mobile terminal comprising:
a DLNA interface unit for receiving multimedia contents information from a server in a DLNA network; and
a control unit configured for:
selecting, from the received multimedia contents information, at least one multimedia file to be accessed by the second mobile terminal, according to an input selection,
generating the multimedia message, in MMS data format, including multimedia file access information corresponding to the at least one selected multimedia file, the multimedia file access information including a DLNA network address of an instrument within the DLNA network in which the selected multimedia file is stored, to enable subsequent access by the second mobile terminal to the selected multimedia file stored at the instrument via the server, and
controlling the DLNA interface unit to send the generated multimedia message to the server in the DLNA network.

24. A content management apparatus for integrally managing contents of instruments connected to a DLNA network, comprising:
a DLNA interface unit for controlling the communication of the DLNA network and for receiving a multimedia message from a sender's mobile terminal;
a multimedia content storage unit for storing multimedia contents information accessible through the DLNA network, the contents information including information on multimedia files accessible through the DLNA network and multimedia access information including a DLNA network address of an instrument in which multimedia files are stored;
a control unit for controlling, if a request signal for multimedia contents information is received from the sender's mobile terminal through the DLNA interface unit, the DLNA interface unit such that multimedia contents information stored in the multimedia content storage unit is transmitted to the sender's mobile terminal according to the request signal;
a document conversion unit for converting, if the multimedia message in MMS data format is received through the DLNA interface unit from the sender's mobile terminal, the multimedia message to a web page, the multimedia message being intended for a receiver's mobile terminal connected in another network; and
a web communication interface unit for controlling web communication and transmitting, via Internet, the web page converted by the document conversion unit as an Internet mail to the receiver's mobile terminal in the another network.

* * * * *